(12) United States Patent
Weathers (10) Patent No.: US 6,210,019 B1
(45) Date of Patent: Apr. 3, 2001

(54) METHOD FOR RETROFITTING AND RETROFIT KIT FOR FLUORESCENT LIGHTING FIXTURE

(75) Inventor: Robert W. Weathers, Jonesboro, GA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/432,930

(22) Filed: Nov. 3, 1999

Related U.S. Application Data
(60) Provisional application No. 60/106,972, filed on Nov. 4, 1998.

(51) Int. Cl.$^7$ .................................................. F21V 19/00
(52) U.S. Cl. ............................ 362/220; 362/225; 362/374
(58) Field of Search ........................... 362/217, 220–225, 362/219, 260, 362, 372, 374, 375, 250

(56) References Cited

U.S. PATENT DOCUMENTS

| | | | |
|---|---|---|---|
| 3,358,133 | * 12/1967 | Thoman et al. ..................... | 362/374 |
| 4,238,815 | * 12/1980 | Price .................................. | 362/223 |
| 5,371,661 | * 12/1994 | Simpson ............................. | 362/220 |
| 6,079,851 | * 6/2000 | Altman et al. ...................... | 362/260 |

* cited by examiner

Primary Examiner—Alan Cariaso
(74) Attorney, Agent, or Firm—Carlo S. Bessone (57) ABSTRACT

A retrofit kit is provided for an existing fluorescent lighting fixture that includes a channel. The retrofit kit includes a retrofit assembly and retaining chains attachable to the channel and movably attachable to the retrofit assembly. The retrofit assembly is movable between an installation position suspended by the retaining chains from the channel and an operating position secured to the channel by the retaining chains. The retrofit assembly may include a reflector pan, lamp sockets mounted to the reflector pan and a lamp ballast mounted to the reflector pan and electrically connected to the sockets. Electrical connections to the retrofit assembly are made with the retrofit assembly in the installation position suspended by the retaining chains. Locking caps are used to lock the retaining chains to the reflector pan and to enclose free ends of the retaining chains.

21 Claims, 9 Drawing Sheets

METHOD FOR RETROFITTING AND RETROFIT KIT FOR FLUORESCENT LIGHTING FIXTURE

CROSS REFERENCE TO RELATED APPLICATION

This application claims the benefit of provisional application Ser. No. 60/106,972 filed Nov. 4, 1998.

FIELD OF THE INVENTION

This invention relates to fluorescent lighting fixtures of the type that may be used in industrial, commercial and office applications and, more particularly, to retrofit kits for replacing long fluorescent lamps, typically 8 foot fluorescent lamps, with shorter fluorescent lamps, typically 4 foot fluorescent lamps, that have higher efficiency and/or lumen output, and to methods for retrofitting such lighting fixtures.

BACKGROUND OF THE INVENTION

Figure 1:
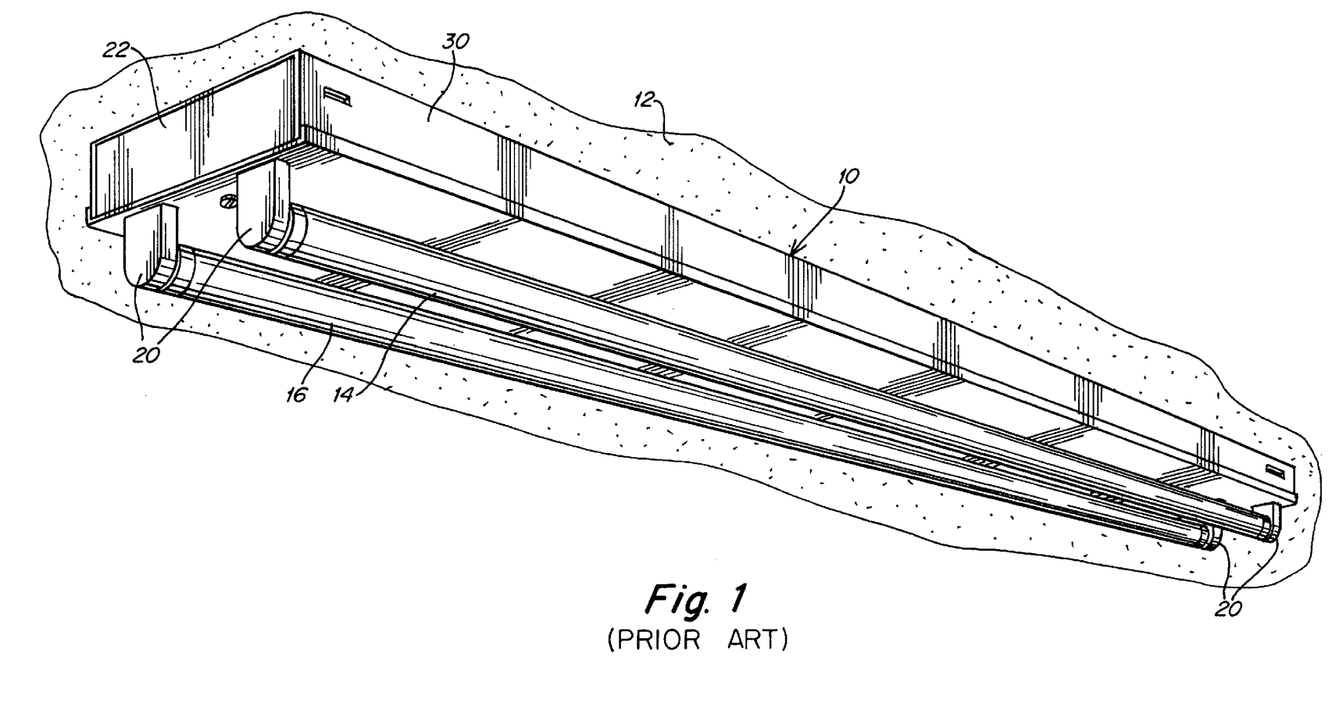
FIG. 1 is a perspective view of a prior art surface mount fluorescent lighting fixture.
Figure 2:
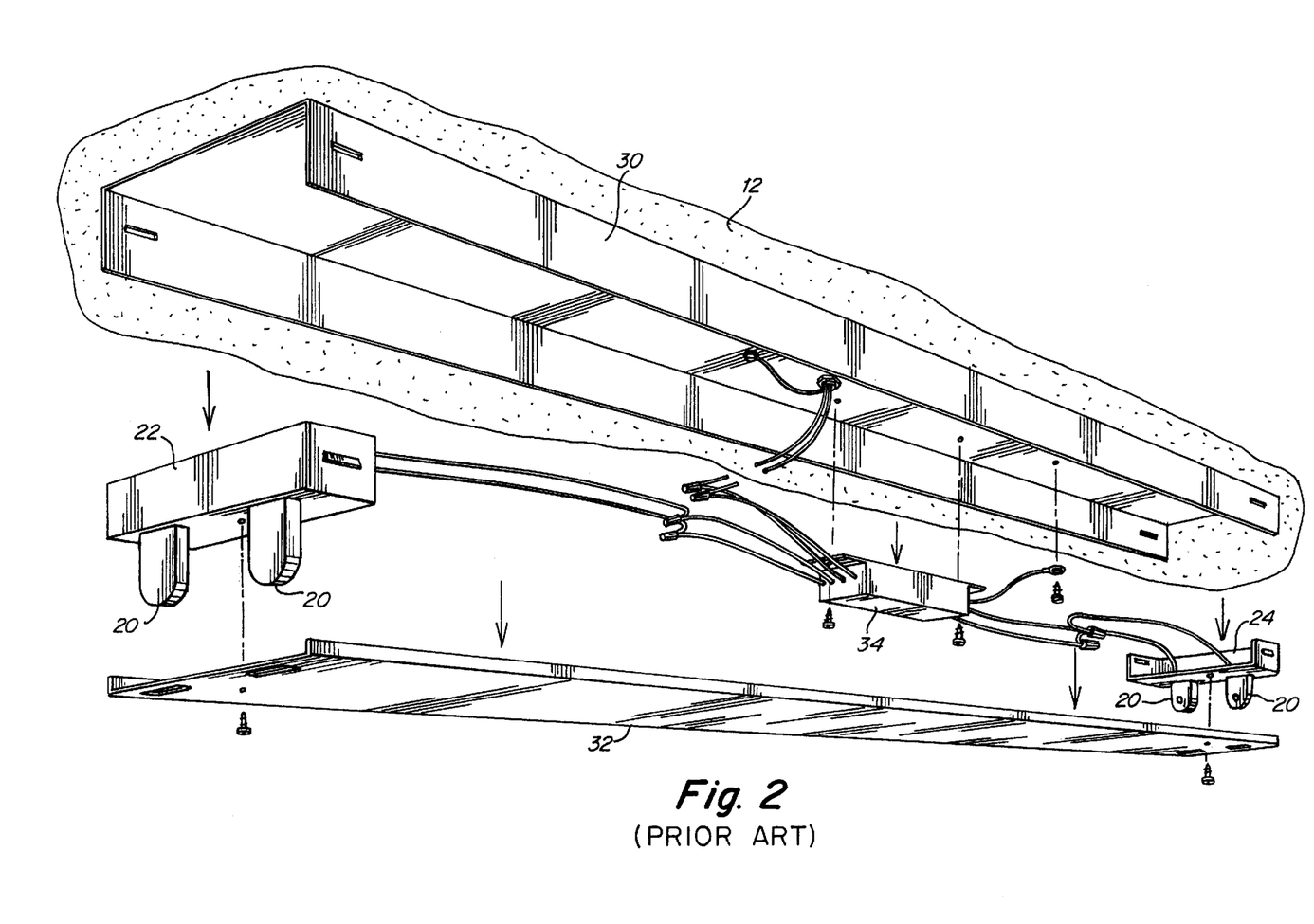
FIG. 2 is an exploded view of the lighting fixture of FIG. 1, illustrating removal of components during the retrofitting process.

Surface mount fluorescent lighting fixtures are widely used in industrial, commercial and office applications. As shown in FIGS. 1 and 2, a surface mount fluorescent lighting fixture 10 is mounted to a ceiling 12. Lighting fixture 10 includes fluorescent lamps 14 and 16 installed in sockets 20. Sockets 20 are mounted in end plates 22 and 24, which in turn are mounted in a channel 30. A reflector pan 32 covers channel 30 and end plates 22 and 24. A lamp ballast 34 is mounted within channel 30 and is electrically connected to sockets 20.

Prior art fluorescent lighting fixtures of the type shown in FIGS. 1 and 2 typically utilize 8 foot fluorescent lamps of relatively mature and stable design. In recent years, the trend toward energy efficient lighting has resulted in fluorescent lamps with increased efficiency and lumen output. The newer fluorescent lamps typically have a 4 foot configuration and thus cannot be used as a direct replacement in fixtures designed for 8 foot lamps. Accordingly, the desire to reduce energy costs and/or to increase lumen output in facilities utilizing lighting fixtures of the type shown in FIGS. 1 and 2 has resulted in the development of retrofit kits. Such retrofit kits permit two or more 4 foot fluorescent lamps to replace the 8 foot fluorescent lamps in existing lighting fixtures.

In order to maximize the attractiveness of the retrofit kits, the associated costs should be minimized. In addition to the energy costs for operating the fluorescent lamps, those costs include the initial cost of the retrofit kit hardware and the cost of installing the retrofit kit. Installation can be cumbersome, time consuming and costly because of the awkward location of the lighting fixture on a ceiling. A ladder is required in most cases. In addition, the retrofit kit must be connected to the existing channel while holding the retrofit kit near the ceiling. Another problem with existing retrofit kits is the bending or damage to components of the existing lighting fixture that may be caused during installation of the retrofit kit. Accordingly, there is a need for retrofit kits for fluorescent lighting fixtures, which are low in cost and easy to install.

SUMMARY OF THE INVENTION

According to a first aspect of the invention, a retrofit kit is provided for an existing fluorescent lighting fixture that includes a channel. The retrofit kit comprises a retrofit assembly and retaining chains attachable to the channel and movably attachable to the retrofit assembly. The retrofit assembly is movable between an installation position suspended by the retaining chains from the channel and an operating position secured to the channel by the retaining chains.

The retrofit assembly may comprise a reflector pan, lamp sockets mounted to the reflector pan and a lamp ballast mounted to the reflector pan and electrically connected to the sockets. The sockets may be configured for operation of two, four or six fluorescent lamps.

The retrofit kit may further comprise L-shaped brackets for securing the retaining chains to the channel. The L-shaped brackets may have slots for receiving the respective retaining chains. The slots may be formed in first and second legs of the L-shaped brackets, so that the retaining chains are locked in the L-shaped brackets when the L-shaped brackets are mounted to the channel.

The reflector pan may be provided with slots for receiving and securing the retaining chains. The retrofit kit may further comprise locking elements for locking the respective retaining chains to the reflector pan. The locking elements may comprise locking caps which enclose free ends of the retaining chains. The locking caps may include tabs that snap into the reflector pan. The locking caps are configured to lock the retaining chains into the slots in the reflector pan.

According to another aspect of the invention, a method is provided for retrofitting an existing fluorescent lighting fixture. The method comprises the steps of removing components of the existing lighting fixture from a channel of the existing lighting fixture, attaching retaining chains to the channel and attaching a retrofit assembly to the retaining chains in an installation position, wherein the retrofit assembly is suspended from the channel by the retaining chains. Electrical connections are made to the retrofit assembly with the retrofit assembly in the installation position. Then the retrofit assembly is moved from the installation position to an operating position wherein the retrofit assembly is affixed to the channel, and the retrofit assembly is secured to the channel with the retaining chains.

BRIEF DESCRIPTION OF THE DRAWINGS

For a better understanding of the present invention, reference is made to the accompanying drawings, which are incorporated herein by reference, and in which.

DETAILED DESCRIPTION

Figure 3:
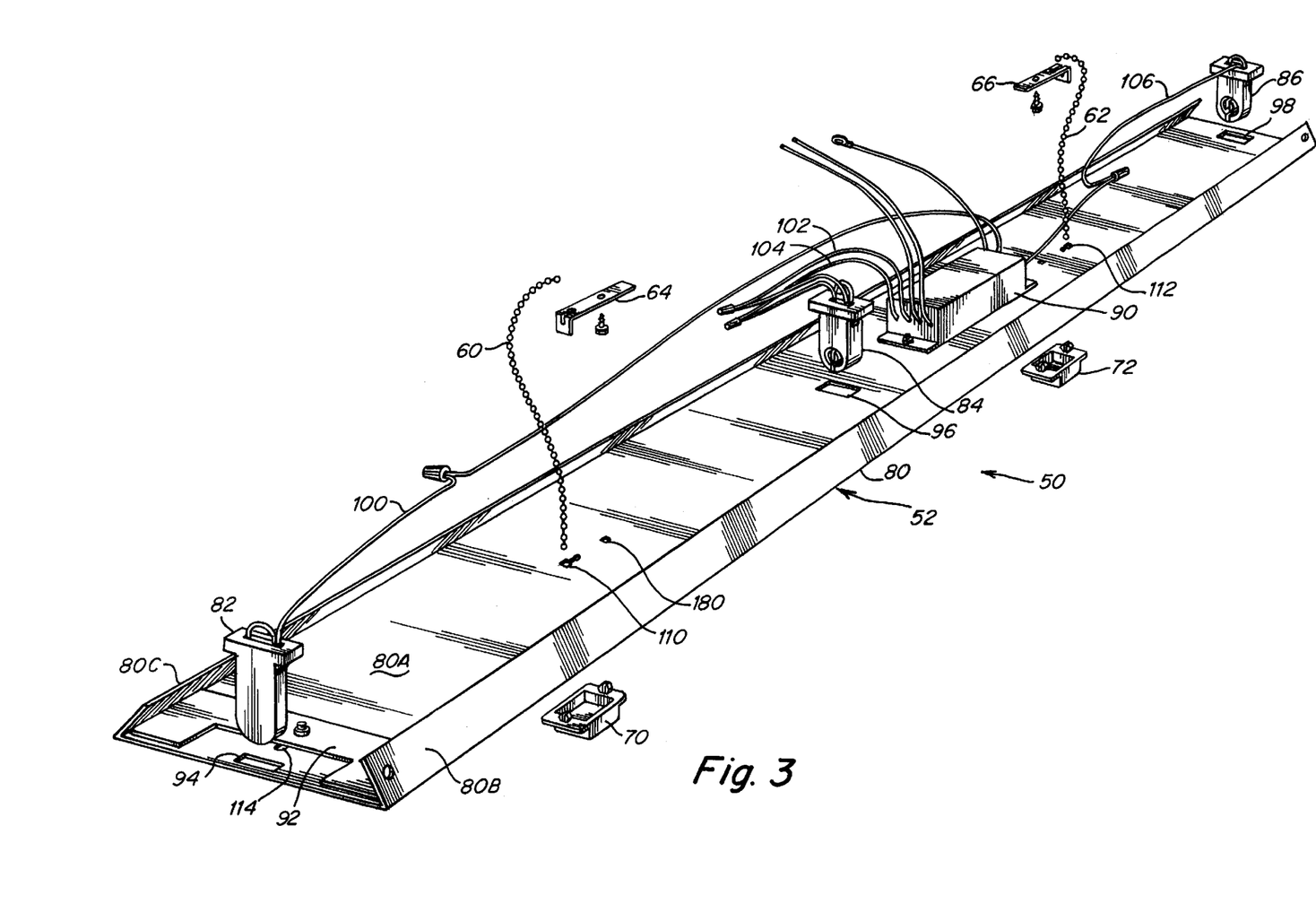
FIG. 3 is a perspective, partially-exploded view of an example of a retrofit kit in accordance with the invention.

A retrofit kit for a surface mount fluorescent lighting fixture in accordance with an embodiment of the invention as shown in FIG. 3. A retrofit kit 50 includes a retrofit assembly 52 that may be preassembled at the factory, retaining chains 60 and 62, L-shaped brackets 64 and 66 for mounting retaining chains 60 and 62, respectively, as described below, and locking caps 70 and 72. A completed lighting fixture, of course, includes fluorescent lamps. However, the fluorescent lamps are sold separately and are not considered part of retrofit kit 50. The retrofit kit 50 shown in FIG. 3 is configured for two fluorescent lamps. As described below, the retrofit kit may be configured for a greater number of fluorescent lamps.

Retrofit assembly 52 includes a reflector pan 80, lamp sockets 82, 84 and 86, a lamp ballast 90 and may include an alignment plate 92. Reflector pan 80 includes slots 94, 96 and 98 for mounting of lamp sockets 82, 84 and 86, respectively. In a typical configuration, the lamp sockets 82, 84 and 86 snap into the respective slots 94, 96 and 98 in reflector pan 80. The lamp sockets 82, 84 and 86 may be of conventional design for fluorescent lamps. Lamp ballast 90 is mounted to reflector pan 80 and is electrically connected by wires 100, 102, 104 and 106 to lamp sockets 82, 84 and 86. Lamp ballast 90 contains circuitry for operation of the fluorescent lamps, as known in the art. Preferably, lamp ballast 90 is prewired to lamp sockets 82, 84 and 86 at the factory. Lamp sockets 82, 84 and 86 may be included in the retrofit kit 50 without being snapped into the reflector pan 80 to facilitate packaging and shipment.

Reflector pan 80 may be fabricated of sheet metal and includes a flat portion 80A and upwardly extending flanges 80B and 80C. The length and width of reflector pan 80 are selected based on the dimensions of the fluorescent lighting fixture being retrofitted. In a preferred embodiment, reflector pan 80 is somewhat wider than the existing lighting fixture, and flanges 80B and 80C are angled inwardly at about 45 degrees with respect to flat portion 80A. As noted above, reflector pan 80 is provided with slots 94, 96 and 98 for a mounting of lamp sockets. In addition, reflector pan 80 is provided with slots 110 and 112 for securing retaining chains 60 and 62, respectively, as described below. Additionally, reflector pan 80 may be provided with a slot 114 for mounting and adjustment of alignment plate 92.

An installation procedure for retrofitting an existing fluorescent lighting fixture using the retrofit kit shown in FIG. 3 and described above is now described. Referring to FIG. 2, unneeded components of the existing lighting fixture, including fluorescent lamps 14 and 16, reflector pan 32, sockets 20, end plates 22 and 24, and lamp ballast 34, are removed. The electrical connections to ballast 34 are disconnected, leaving channel 30 and the wires for electrical connection of the retrofit kit. As shown in FIG. 2, channel 30 typically has a U-shaped cross-section and is about 8 feet in length.

Figure 6:
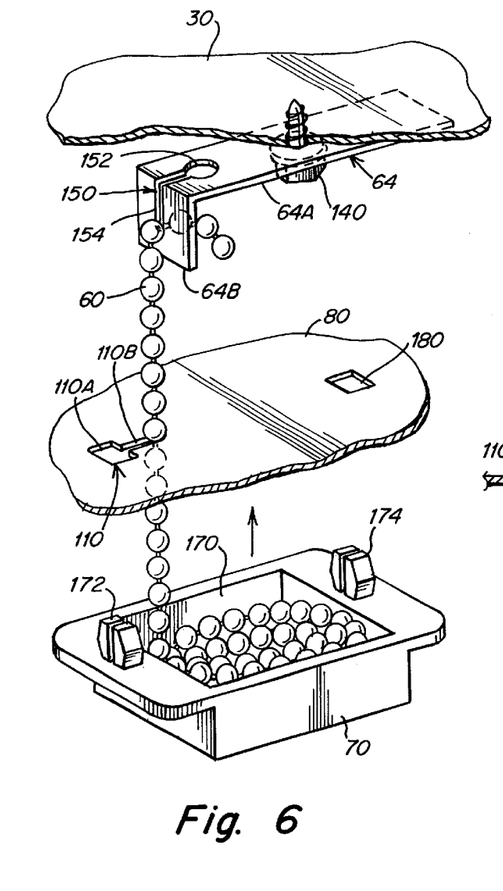
FIG. 6 is an exploded partial perspective view that illustrates the attachment of the retaining chains to the channel and to the reflector pan, and the enclosure of the free end of the retaining chain in a locking cap.
Figure 7:
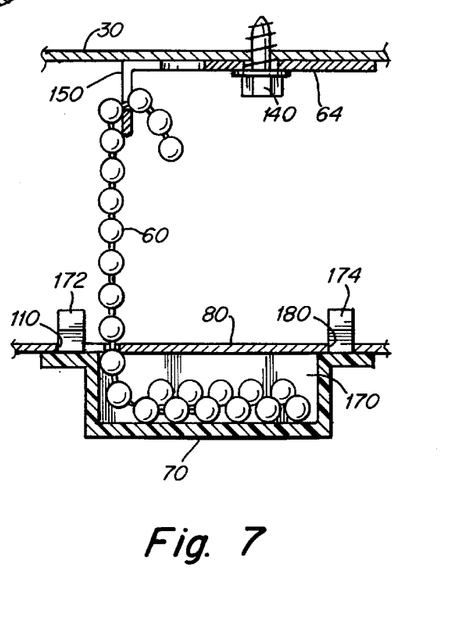
FIG. 7 is a partial cross-sectional view of the retrofitted lighting fixture, illustrating the attachment of the retaining chain to the channel and to the reflector pan, and the enclosure of the free end of the retaining chain in the locking cap.

Installation of retrofit kit 50 is described with reference to FIGS. 4–7. Retaining chains 60 and 62 are attached to channel 30 using L-shaped brackets 64 and 66, respectively. Referring to FIGS. 6 and 7, L-shaped bracket 64 includes a first leg 64A that may be attached to channel 30 with a self-tapping screw 140 and a second leg 64B that extends downwardly. L-shaped bracket 64 is provided with a slot 150 for receiving retaining chain 60. Retaining chain 60 may be a bead chain, and for example may be a bead chain having a working strength of about 60 pounds and a length of about 8–12 inches. Slot 150 includes an enlarged portion 152 of sufficient size to pass the beads in chain 60 and a narrow portion 154 having a width that is selected to prevent passage of the beads in chain 60. Narrow portion 154 extends from enlarged portion 152 in first leg 64A to second leg 64B, as best shown in FIG. 6. When L-shaped bracket 64 is mounted to channel 30, as shown in FIGS. 6 and 7, enlarged portion 152 abuts against channel 30, thereby preventing removal of retaining chain 60 from L-shaped bracket 64. It will be understood that L-shaped bracket 66, retaining chain 62 and locking cap 72 may have the same configuration as the corresponding elements shown in FIGS. 6 and 7.

Figure 4:
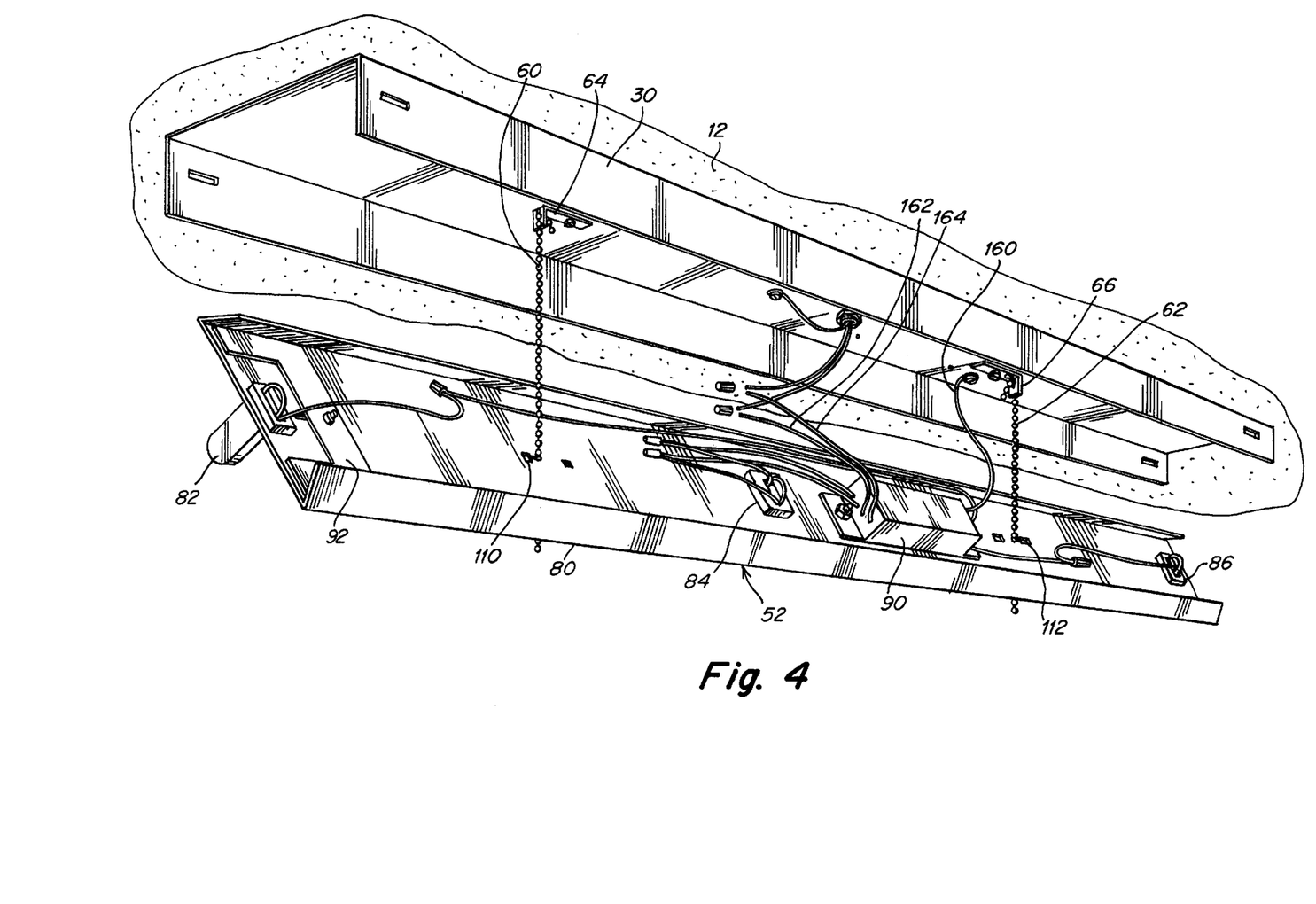
FIG. 4 is a perspective view that illustrates the retrofit assembly suspended by retaining chains in the installation position.

If necessary, sockets 82, 84 and 86 are snapped into reflector pan 80. Then retrofit assembly 52 is lifted to an installation position, shown in FIG. 4, below channel 30, and chains 60 and 62 are fed through slots 110 and 112, respectively, and are attached to reflector pan 80. As shown in FIG. 6, slot 110 includes an enlarged portion 110A of sufficient width to pass the beads in chain 60 and a narrow portion 110B having a width selected to prevent passage of the beads in chain 60. At this point, retrofit assembly 52 is suspended by chains 60 and 62 from channel 30 in the installation position. In the installation position, a ground wire 160 of lamp ballast 90 is connected to channel 30, as shown in FIG. 4. In addition, power leads 162 and 164 of lamp ballast 90 are connected to the respective power leads of the existing lighting fixture.

Figure 5:
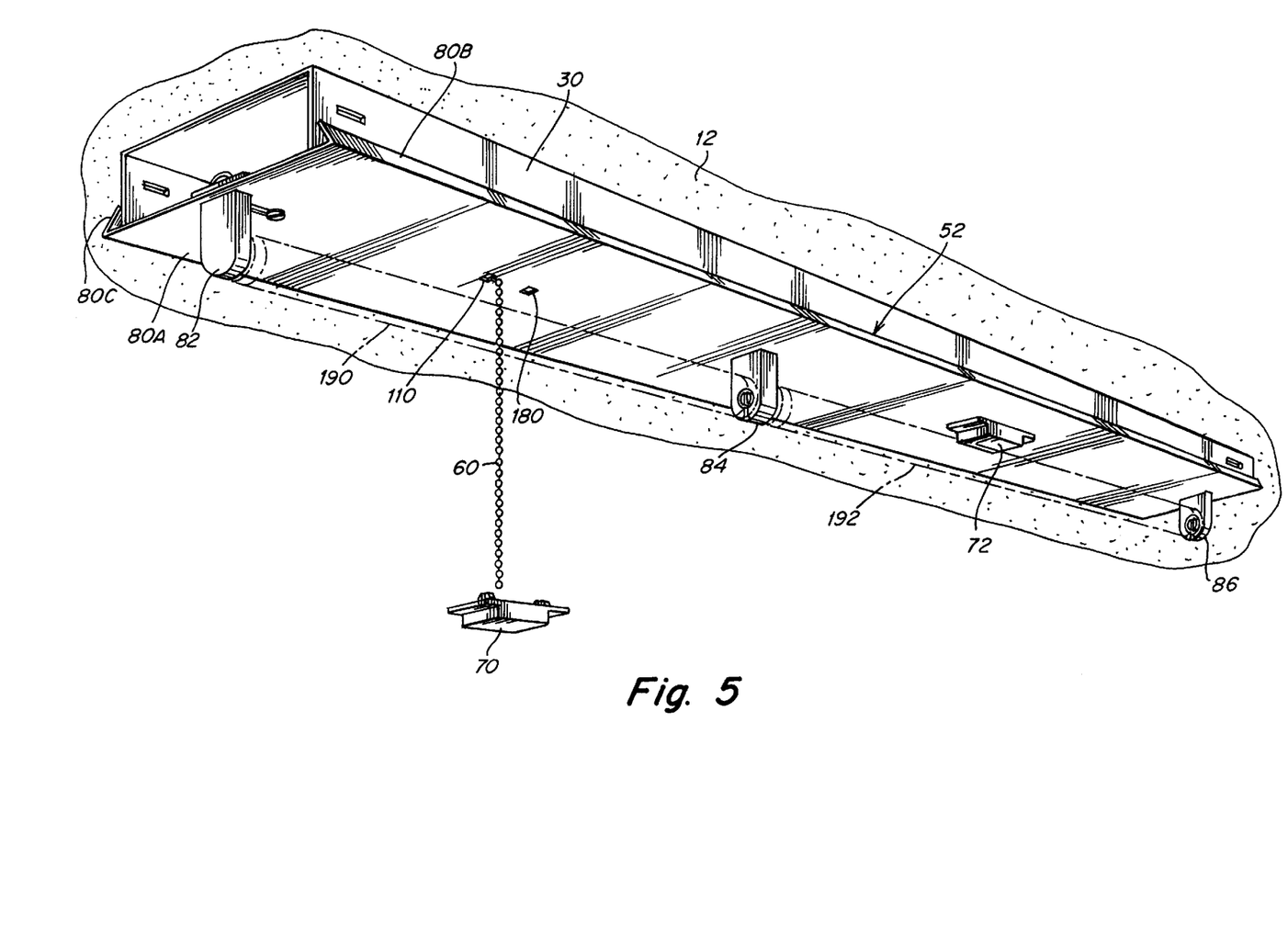
FIG. 5 is a perspective view that illustrates the retrofit assembly in the operating position and illustrates the use of locking caps for enclosing free ends of the retaining chains.

Then, retrofit assembly 52 is lifted from the installation position shown in FIG. 4 to an operating position shown in FIG. 5, wherein reflector pan 80 is secured to the bottom of channel 30. Retaining chain 60 is pulled through the enlarged portion 110A of slot 110, and retaining chain 62 is pulled through an enlarged portion of slot 112. The retaining chains 60 and 62 are then secured in the narrow portions of the respective slots 110 and 112, as shown in FIG. 5, so that the retrofit assembly 52 is secured to channel 30 by retaining chains 60 and 62.

Locking caps 70 and 72 are then snapped into reflector pan 80 and enclose the free ends of the respective retaining chains 60 and 62. In FIG. 5, locking cap 70 is shown prior to installation, and locking cap 72 is shown after installation. As shown in FIGS. 6 and 7, locking cap 70 has an interior chamber 170 for enclosing the free end of retaining chain 60, and includes resilient tabs 172 and 174. Locking cap 72 may have the same configuration. Reflector pan 80 is provided with a slot 180 having a spacing from the enlarged portion 110A of slot 110 that corresponds to the spacing between resilient tabs 172 and 174 on locking cap 70. Locking cap 70 is attached to reflector pan 80 with resilient tabs 172 snapped into enlarged portion 110A and resilient tabs 174 snapped into slot 180. Since tabs 172 fill enlarged portion 110A of slot 110, retaining chain 60 is locked into slot 110. Thus, retaining chains 60 and 62 lock retrofit assembly 52 in the operating position, and the free ends of the retaining chains are hidden from view by the respective locking caps 70 and 72. It will be understood that different locking cap configurations may be utilized within the scope of the present invention. At this point, installation of the retrofit kit is complete, and fluorescent lamps 190 and 192 may be installed in the retrofitted lighting fixture.

Figure 8:
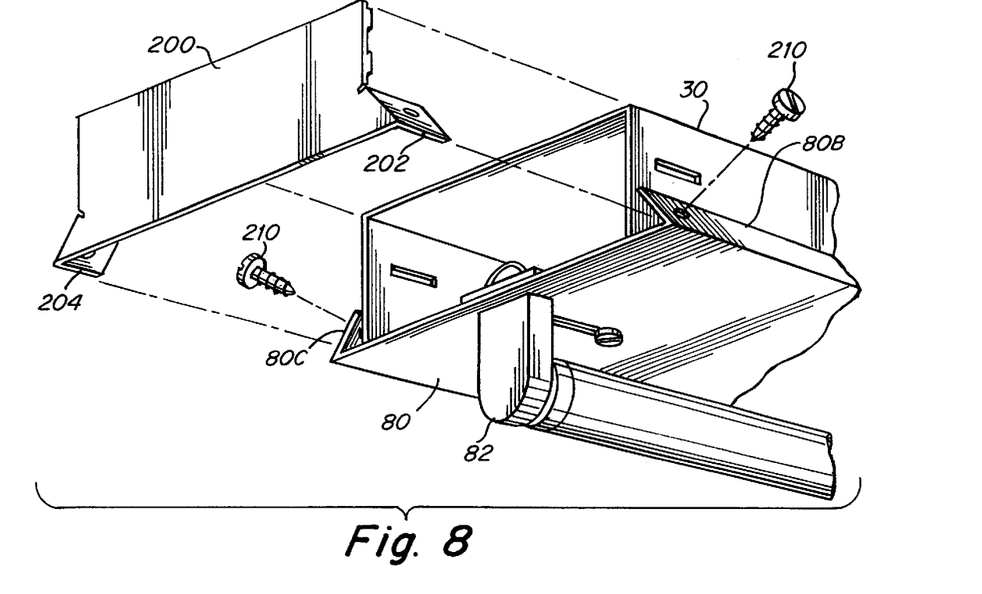
FIG. 8 is an exploded partial perspective view of the retrofitted lighting fixture, illustrating an end cap for enclosing an open end of the retrofitted lighting fixture.
Figure 9:
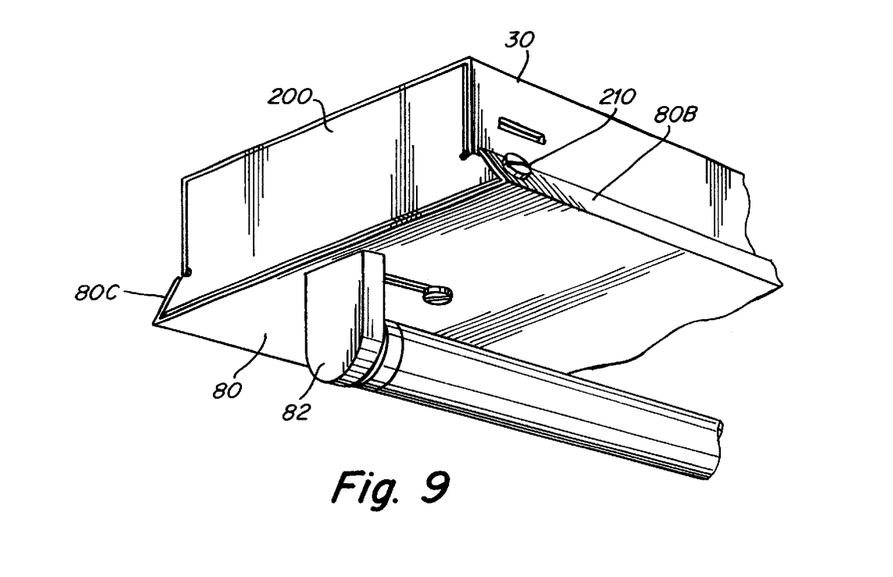
FIG. 9 is a partial perspective view of the retrofitted lighting fixture with the end cap installed.

It will be understood that fluorescent lighting fixtures of the type described herein may be mounted end-to-end for increased length. An end cap may be utilized to enclose the open ends of a row of lighting fixtures, as shown in FIGS. 8 and 9. An end cap 200 is provided with tabs 202 and 204 which are angled to slide inside flanges 80B and 80C of reflector pan 80. End cap 200 is secured in position by sheet metal screws 210.

Figure 10:
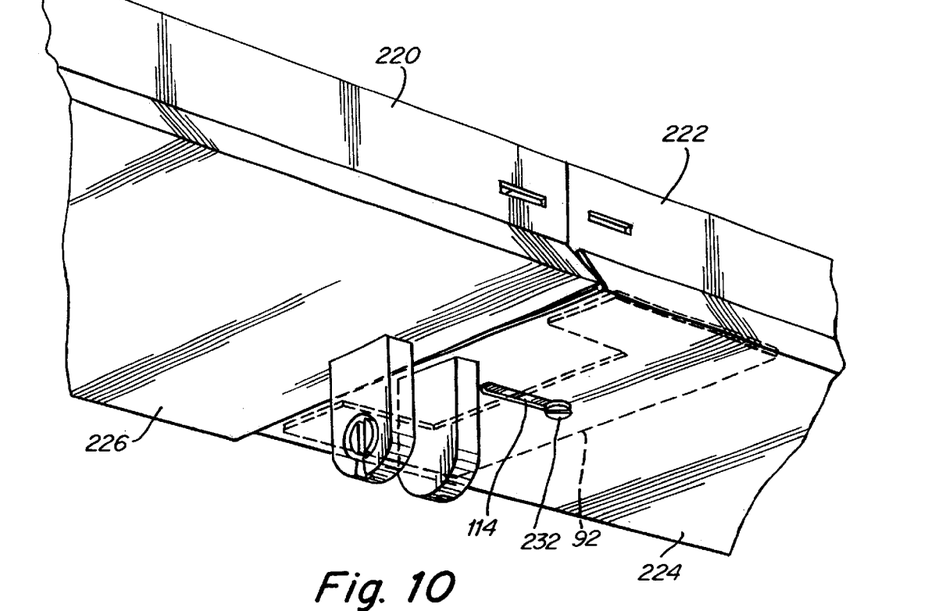
FIG. 10 is a partial perspective view of two fluorescent lighting fixtures mounted end-to-end.
Figure 11:
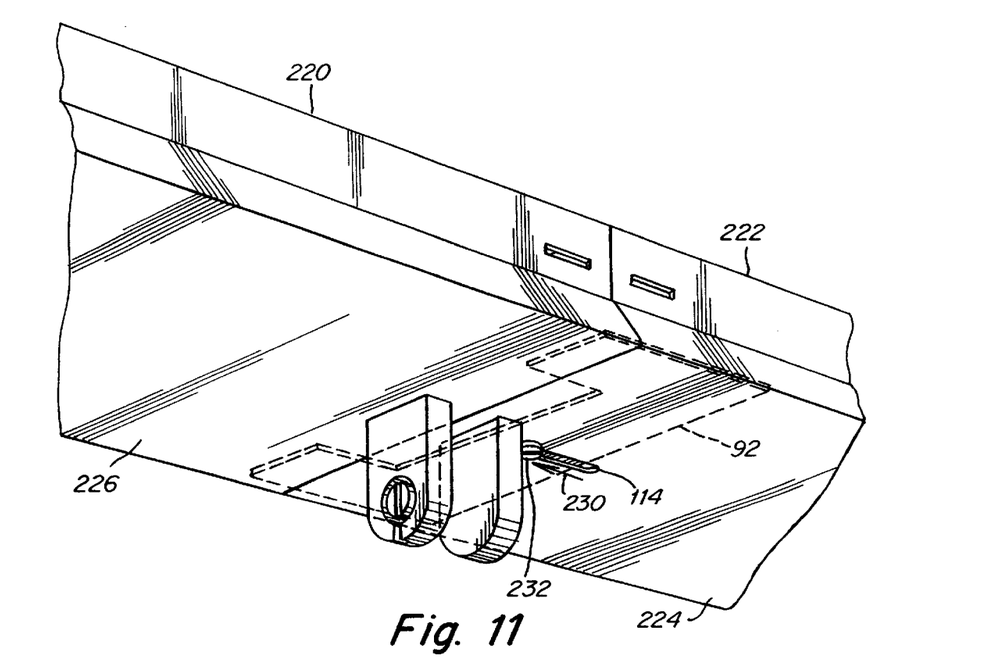
FIG. 11 is a partial perspective view of two fluorescent lighting fixtures, illustrating the use of an alignment plate.

As shown in FIGS. 10 and 11, retrofitted lighting fixtures 220 and 222 may be mounted end-to-end. Alignment plate 92 is used to correct any misalignment between lighting fixtures 220 and 222. In the illustrated embodiment, alignment plate 92 is U-shaped to provide clearance for the lamp sockets. As shown, alignment plate 92 is mounted to reflector pan 224 in elongated slot 114. The reflector pans of lighting fixtures 220 and 222 are manually aligned, and alignment plate 92 is slid in the direction of arrow 230 so that it engages reflector pans 224 and 226. Mounting screw 232 is then tightened, thereby securing reflector pans 224 and 226 in proper alignment.

Figures 12, 13:
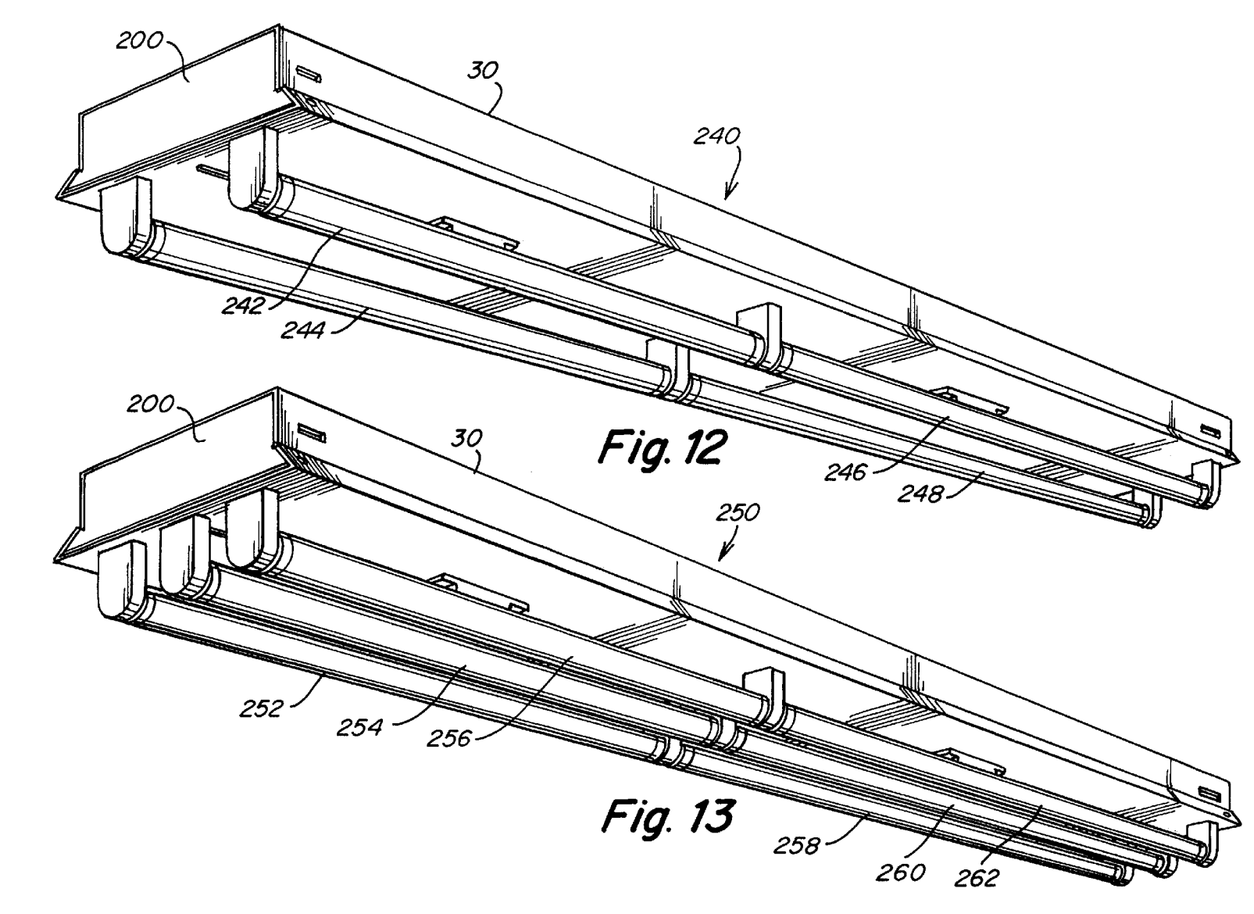
FIG. 12 is a perspective view of a four lamp lighting fixture.
FIG. 13 is a perspective view of a six lamp lighting fixture.

A two lamp retrofitted lighting fixture is shown and described above. It will be understood that the present invention is not limited to a two lamp retrofit kit. A four lamp retrofitted lighting fixture 240 is shown in FIG. 12, and a six lamp retrofitted lighting fixture 250 is shown in FIG. 13. In each case, the retrofit kit includes retaining chains and a retrofit assembly. The retrofit assembly includes a reflector pan, a lamp ballast and an appropriate number of lamp sockets. The retrofit kit is installed as described above. Lighting fixture 240 typically includes 4 foot fluorescent lamps 242, 244, 246 and 248. Lighting fixture 250 typically includes 4 foot fluorescent lamps 252, 254, 256, 258, 260 and 262.

It will be understood that numerous variations are included within the scope of the present invention. For example, retaining chains 60 and 62 may be attached to channel 30 using any suitable bracket or other attachment device. Different types of retaining chains may be utilized to suspend the retrofit assembly in an installation position and to secure the retrofit assembly in the operating position. A variety of different locking cap configurations may be utilized for locking the retaining chains to the reflector pan and for enclosing the free ends of the retaining chains. Different flange arrangements may be utilized on the reflector pan 80. For example, the flanges on the reflector pan 80 may have different angles and directions to direct light from the reflector pan. In one embodiment, flanges extend downwardly from the flat portion of the reflector pan to direct light downwardly.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A retrofit kit for a fluorescent lighting fixture, said lighting fixture including a channel, comprising:
   a retrofit assembly; and
   retaining chains attachable to the channel and movably attachable to said retrofit assembly, wherein said retrofit assembly is movable between an installation position suspended by said retaining chains from the channel and an operating position secured to the channel by said retaining chains.

2. A retrofit kit as defined in claim 1, wherein said retrofit assembly comprises a reflector pan, lamp sockets mounted to said reflector pan and a lamp ballast mounted to said reflector pan and electrically connected to said sockets.

3. A retrofit kit as defined in claim 2, wherein said sockets are configured for operation of two fluorescent lamps.

4. A retrofit kit as defined in claim 2, wherein said sockets are configured for operation of four fluorescent lamps.

5. A retrofit kit as defined in claim 2, wherein said sockets are configured for operation of six fluorescent lamps.

6. A retrofit kit as defined in claim 1, further comprising L-shaped brackets for securing said retaining chains to the channel, said L-shaped brackets having slots for receiving the respective retaining chains.

7. A retrofit kit as defined in claim 6, wherein the slots are formed in first and second legs of the L-shaped brackets, so that the retaining chains are locked in the L-shaped brackets when the L-shaped brackets are mounted to the channel.

8. A retrofit kit as defined in claim 1, wherein said retaining chains comprise bead chains.

9. A retrofit kit as defined in claim 2, wherein said reflector pan is provided with slots for receiving and securing the respective retaining chains.

10. A retrofit kit as defined in claim 9, further comprising locking elements for locking the respective retaining chains to the reflector pan.

11. A retrofit kit as defined in claim 10, wherein said locking elements comprise locking caps for enclosing free ends of the retaining chains.

12. A retrofit kit as defined in claim 11, wherein said locking caps include tabs that snap into said reflector pan.

13. A retrofit kit as defined in claim 12, wherein said locking caps are configured to lock said retaining chains into the slots in said reflector pan.

14. A retrofit kit as defined in claim 2, wherein said retrofit assembly further comprises an alignment element for aligning the reflector pan to an adjacent reflector pan.

15. A retrofit kit for a fluorescent lighting fixture, said lighting fixture including a channel, comprising:
   a retrofit assembly comprising a reflector pan, lamp sockets mounted to said reflector pan and a lamp ballast mounted to said reflector pan and electrically connected to said lamp sockets, said reflector pan having first and second slots;
   first and second retaining chains attachable to the channel and movably attachable to the slots in said reflector pan, wherein said retrofit assembly is movable between an installation position suspended by said retaining chains from the channel and an operating position secured to the channel by said retaining chains; and
   locking caps for locking said retaining chains in said slots in the operating position and for enclosing free ends of said retaining chains.

16. A method for retrofitting a fluorescent lighting fixture, comprising the steps of:
   removing components of an existing lighting fixture from a channel of the existing lighting fixture;

attaching retaining chains to the channel;

attaching a retrofit assembly to the retaining chains in an installation position, wherein the retrofit assembly is suspended from the channel by the retaining chains;

making electrical connections to the retrofit assembly with the retrofit assembly in the installation position;

moving the retrofit assembly from the installation position to an operating position, wherein the retrofit assembly is affixed to the channel; and securing the retrofit assembly to the channel with the retaining chains.

17. A method as defined in claim 16, wherein the step of removing components comprises removing one or more lamps, sockets and a ballast from the existing lighting fixture.

18. A method as defined in claim 16, wherein the step of attaching retaining chains to the channel comprises securing the retaining chains in slots in L-shaped brackets and mounting the L-shaped brackets to the channel.

19. A method as defined in claim 16, wherein said retrofit assembly comprises a reflector pan, lamp sockets mounted to said reflector pan and a lamp ballast electrically connected to said sockets and mounted to said reflector pan, said reflector pan having slots, wherein step of attaching the retrofit assembly to the retaining chains comprises securing the retaining chains in the slots in said reflector pan.

20. A method as defined in claim 16, wherein the step of securing the retrofit assembly to the channel in the operating position includes locking the retaining chains to said retrofit assembly.

21. A method as defined in claim 20, wherein the step of locking the retaining chains to the retrofit assembly further comprises enclosing free ends of the retaining chains in locking caps.

* * * * *